United States Patent

[11] 3,553,530

| [72] | Inventor | Robert Ernest Gregson<br>Scottsdale, Ariz. |
|---|---|---|
| [21] | Appl. No. | 838,829 |
| [22] | Filed | July 3, 1969 |
| [45] | Patented | Jan. 5, 1971 |
| [73] | Assignee | Motorola, Inc.<br>Franklin Park, Ill.<br>a corporation of Illinois |

[54] AUTOMATICALLY RESETTING OVERVOLTAGE PROTECTION MEANS FOR AN ALTERNATING CURRENT CIRCUIT
7 Claims, 1 Drawing Fig.

| [52] | U.S. Cl. | 317/16,<br>317/22, 317/31, 317/33, 317/36, 307/100 |
|---|---|---|
| [51] | Int. Cl. | H02h 3/04,<br>H02h 3/20 |
| [50] | Field of Search | 317/16, 22,<br>36, 31, 33; 321/(Inquired); 307/100 |

[56] References Cited
UNITED STATES PATENTS

| 3,132,287 | 5/1964 | Yarbrough | 317/33 |
| 3,295,020 | 12/1966 | Borkovitz | 317/16X |

*Primary Examiner*—J. D. Miller
*Assistant Examiner*—Harvey Fendelman
*Attorney*—Mueller, Aichele & Rauner ABSTRACT: An overvoltage protection circuit is disclosed in which the voltage across the line that is applied to the load is sampled during an early portion of a half-cycle. If this voltage is too high, during the next half-cycle, the circuit supplying the load is broken and the supply circuit remains broken for one complete cycle after the half-cycle during which the sampled overvoltage is taken. Since the voltage is sampled during alternate half-cycles, and the circuit is broken during the next half-cycles, the overvoltage protective circuit operates within one cycle and also automatically resets result when the overvoltage disappears.

PATENTED JAN 5 1971
3,553,530
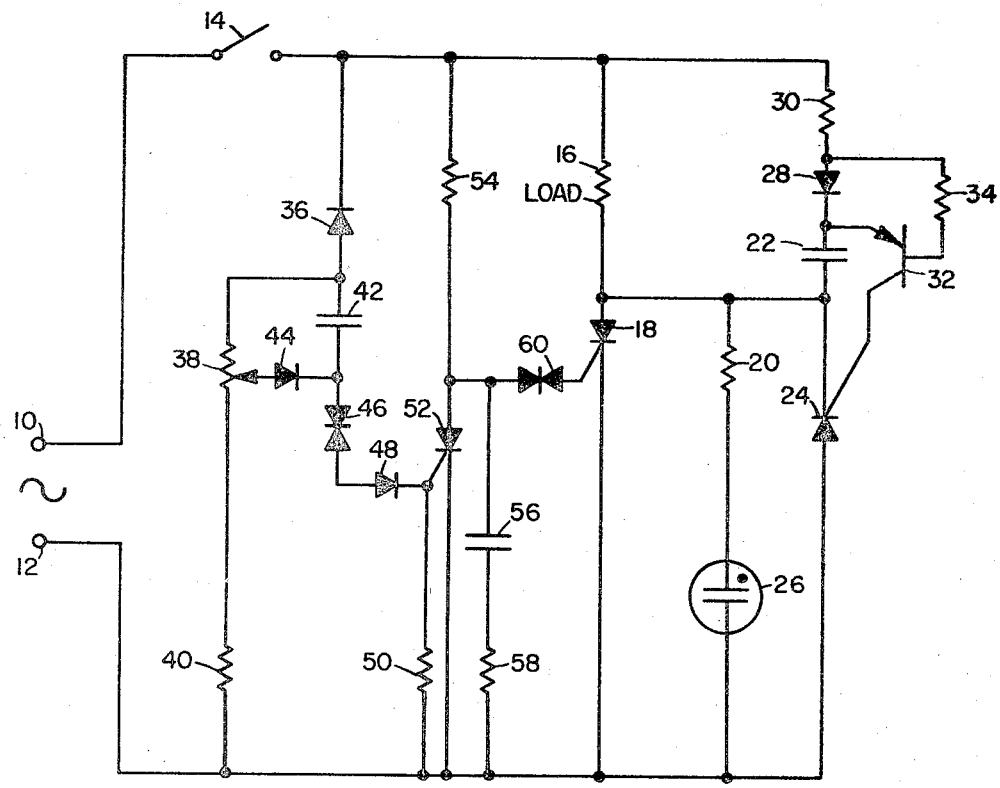
INVENTOR.
Robert Ernest Gregson
BY
Mueller, Aichele, Rauner
ATTY'S.

3,553,530

AUTOMATICALLY RESETTING OVERVOLTAGE PROTECTION MEANS FOR AN ALTERNATING CURRENT CIRCUIT

BACKGROUND

This invention relates to automatically resettable overvoltage protective apparatus.

Overvoltage protective devices are provided to protect circuits in which they are included from the destructive affect of the application to such a circuit of a voltage that is higher than the rated value. Such protective apparatus should operate very quickly to disconnect the load from the voltage supply before any damage can be done. Furthermore, it is desirable that the disconnection should not continue after the overvoltage has disappeared and without manual resetting of the circuit.

DESCRIPTION

According to the invention, a voltage which is a measure of the voltage applied to the load is stored or sampled, and if this voltage is above a predetermined amount, the supply circuit for the load is disconnected during the next half-cycle and remains disconnected for one complete cycle. In the second half of the said complete cycle, the voltage that is applied to the load is stored or sampled and the disconnection is continued for another full cycle if the supply voltage is still too high. However, if the supply voltage is not excessive, this supply voltage circuit is completed to supply current to the load in the next half cycle. In this manner, overvoltage is not applied to the load for more than a half-cycle and when the overvoltage disappears, the now normal voltage is applied to the load.

DESCRIPTION OF THE DRAWING

The invention will be better understood upon reading the following description in connection with the accompanying drawing in which the sole FIG. illustrates a circuit which is supplied by alternating current and which includes an embodiment of this invention.

An alternating current supply is connected between the terminals 10 and 12. The terminal 10 is connected by way of a switch 14 to one terminal of a load 16. The other terminal of the load 16 is connected to the anode of a silicon controlled rectifier (hereinafter SCR) 18, to one terminal of a resistor 20, to one terminal of a storage capacitor 22 and to the cathode of an SCR 24. The cathode of the SCR 18 is connected to the other input terminal 12 and the other terminal of the resistor 20 is connected by way of the gas-filled tube 26 to the terminal 12. The other terminal of the capacitor 22 is connected to the cathode of a diode 28 whose anode is connected by way of a resistor 30 to the switch 14. The junction of the resistor 30 and the diode 28 is connected to the base of a PNP transistor 32 by way of a resistor 34. The emitter of the transistor 32 is connected to the junction of a capacitor 22 and a diode 28. The collector of the transistor 32 is connected to the control electrode of the SCR 24. The anode of the SCR 24 is connected to the terminal 12.

The switch 14 is also connected to the cathode of a diode 36. The anode of the diode 36 is connected by way of the resistance portion of a potentiometer 38 and a resistor 40 to the terminal 12. The anode of the diode 36 is also connected by way of a storage capacitor 42 to the cathode of a diode 44 and by way of a threshold device 46 to the anode of a diode 48. The anode of the diode 44 is connected to the sliding connection of the potentiometer 38. The cathode of the diode 48 is connected to the terminal 12 by way of a resistor 50 and to the control electrode of an SCR 52. The cathode of the SCR 52 is connected to the terminal 12 and the anode of the SCR 52 is connected to the switch 14 by way of a resistor 54. The anode of the SCR 52 is connected to the terminal 12 by way of series connected capacitor 56 and resistor 58. The anode of the SCR 52 is also connected by way of a threshold device 60 to the control electrode of the SCR 18. The threshold devices 46 and 60 may be three layer or four layer diodes or any other threshold device that exhibits a negative resistance after the threshold has been exceeded.

The operation of the circuit will first be described when the supply voltage across the terminals 10 and 12 is normal. When, after closing the switch 14, the terminal 10 is positive with respect to the terminal 12, that is during a positive half-cycle of the supply voltage, the capacitor 56 will charge by way of the resistors 54 and 58. When the voltage across the capacitor 56 is high enough to break down the threshold device 60, a positive voltage will be applied to the control electrode of the SCR 18, making it conductive, whereby current flows from the terminal 10, through the switch 14, the load 16, the SCR 18 and back to the terminal 12, As is noted, the gas-filled tube is across the SCR 18. The breakdown voltage of the gas-filled tube 26 is much greater than the breakdown voltage of the threshold device 60, whereby the gas-filled tube 26 does not break down in any half-cycle in which the threshold device 60 and the SCR 18 becomes conductive. Similarly, the SCR 24 is across the resistor 20 and the gas-filled tube 26, whereby the gas-filled tube 26 will not light up during the next half-cycle when, as will be explained, the SCR 24 is conductive.

Since current is flowing through the load 16, the capacitor 22 is charged by way of the resistor 30 and the diode 28. The voltage on the base of the transistor 32 is positive with respect to its emitter, rendering the PNP transistor 32 nonconductive and the capacitor 22 cannot discharge. Also while the terminal 10 is positive, current cannot flow into the capacitor 42 or through the potentiometer 38 or the resistance 40 due to the poling of the diode 36.

After a half-cycle of the alternating supply voltage, the voltage on the terminal 12 becomes positive with respect to the terminal 10, that is the negative half-cycle succeeds the positive half-cycle. The transistor 32 becomes conductive just before the terminal 10 goes through zero on its way from being positive to becoming negative whereby the charge on the capacitor 22 starts to discharge through the control circuit of the SCR 24 before the anode of the SCR 24 becomes positive, whereby when the terminal 12 is positive with respect to the terminal 10, the SCR 24 becomes positive and the current flows from terminal 12 through the SCR 24, the load 16, the switch 14 and back to the terminal 10. Also during the half-cycle when the terminal 12 is positive, current flows from the terminal 12 through the resistor 40, the potentiometer 38, the diode 36 and the switch 14 back to the terminal 10. The capacitor 42 is charged by the voltage drop across a portion of the potentiometer 38 to a voltage which is a measure of the voltage across the terminals 10 and 12. If, as postulated, this voltage is not excessive, the voltage applied by the capacitor 42 to the threshold device 36 is not enough to break down the threshold device 46 and thereby to cause conduction of the SCR 52. Therefore, the voltage on the capacitor 42 has no affect on the charging of the capacitor 56 or on the operation of the SCR 18 when the voltage on the capacitor 42 is below the breakdown voltage of the threshold device 46. The diode 44 is so poled as to prevent the discharge of the capacitor 42 through the other portion of the potentiometer 38. By varying the position of the slider of the potentiometer 38, the ratio of the voltage across the capacitor 42 to the voltage across the terminals 10 and 12 may be adjusted.

Now let it be assumed that when the terminal 12 is positive and the voltage across the terminals 10 and 12 is excessive, then the capacitor 42 will charge to a voltage sufficiently high to make the SCR 52 conductive by breakover of the threshold 46. However, since the voltage on the anode of the SCR 52 is negative, the SCR 52 cannot be conductive. In the next half-cycle, when the terminal 10 is positive, and the anode of the SCR 52 becomes positive, the capacitor 42 will discharge into the control electrode of the SCR 52 and the SCR 52 will become conductive before the voltage across the capacitor 56 can reach the voltage that will cause the SCR 18 to become conductive. As soon as the SCR 52 becomes conductive, the voltage across the capacitor 56 becomes equal to about 1 volt which is the forward voltage drop in the SCR 52 when conductive. The SCR 18 cannot become conductive since the breakdown device 60 is clamped to about 1 volt by the conductive SCR 52, whereby current flow is cut off from the load 16 during the first positive half-cycle after a negative half-cycle in which the voltage between the terminals 10 and 12 is excessive. Since no current is flowing through the load 16, there is no voltage drop across the load 16 and the capacitor 22 cannot charge and the SCR 24 will not become conductive and no current will flow in the following negative half-cycle through the load 16. During this same half-cycle, (when the terminal 12 is positive with respect to the terminal 10) the voltage across the terminals 10 and 12 is sampled in the capacitor 42. If this sampled voltage is excessive, the SCR 52 will be rendered conductive in the next positive half-cycle, preventing current flow through the load 16 for another cycle. However, just as soon as, during a negative half-cycle, the voltage across the terminals 10 and 12 is not excessive, the normal alternate half-cycle operation of the SCR's 18 and 24 is not interferred with and alternating current flows through the load 16. Therefore, as long as the supply voltage is excessive, current does not flow through the load 16 but as soon as the supply voltage is normal current flows through the load without need to reset the described overvoltage protective device.

When the current is not flowing through the load 16, the SCR's 18 and 20 not being conductive, a high-voltage appears across the gas-filled tube 26 causing it to light up, thereby to indicate that the overvoltage condition exists.

I claim:

1. An overvoltage protective apparatus comprising:
   terminals that may be connected to an alternating current supply;
   a load;
   a switching means;
   a circuit for supplying current to said load through said switching means from said terminals;
   means for causing said switching means to become conductive after a delay period after the beginning of a half-cycle of one polarity of said alternating current supply,
   means to sample the voltage of said supply during half-cycles of the opposite polarity; and
   means responsive to said sampled voltage being greater than a predetermined voltage to disable said means for causing said switching means to become conductive during said delay period.

2. The invention as expressed in claim 1 in which said switching means comprises an SCR and said delay means comprises a capacitor and a resistor connected in series across said terminals, and means are provided for applying the voltage across said capacitor to the control electrode of said SCR by way of a threshold device.

3. The invention as expressed in claim 2 in which said means to sample comprises a first diode and a resistor connected across said terminals and a second capacitor and a second diode connected across at least a portion of said resistor, said first diode being poled to prevent charging of said capacitor during said half-cycle of said one polarity and means for applying the voltage across said second capacitor through a threshold device to inhibit the conduction of said switching means during the half-cycle of said supply of said one polarity when the voltage across said second capacitor is great enough to break down said threshold device.

4. The invention as expressed in claim 1 and including a second switching device connected in parallel with said first switching device, said switching devices each having rectifying properties and being oppositely poled with respect to each other and means to render said second switching device conductive responsive to current flow through said load.

5. An overvoltage device comprising:
   a pair of terminals to which a source of alternating potential may be connected;
   a load;
   a first, a second and a third silicon controlled rectifier each having an anode, a cathode and a control electrode;
   means for connecting one of said terminals through said load and through the anode to cathode path of said first silicon controlled rectifier to the second one of said pair of terminals;
   means connected across said terminals to build up a predetermined voltage after a delay;
   a connection from said voltage building up means to the control electrode of said first silicon rectifier for causing said first silicon controlled rectifier to become conductive upon said predetermined voltage being built up on said voltage building up means;
   means for connecting said anode of said second silicon controlled rectifier to the cathode of said first silicon controlled rectifier and for connecting the cathode of said second silicon controlled rectifier to the anode of said first silicon controlled rectifier;
   means controlled by the current flow in said load and connected to the control electrode of said second silicon controlled rectifier for turning it on when said first silicon controlled rectifier is off;
   means for connecting the anode of said third silicon controlled rectifier to the control electrode of said first silicon controlled rectifier and for connecting the cathodes of said first and third silicon controlled rectifiers together;
   means for sampling the voltage across said source during a half-cycle of said alternating current;
   means including a connection between said voltage sampling device and the control electrode of said third silicon controlled rectifier for causing conduction of said third silicon controlled rectifier during a next half-cycle after the voltage sampled by said voltage sampling device reaches a predetermined amplitude, whereby when said third silicon controlled rectifier is conductive, said first silicon controlled rectifier is prevented from becoming conductive.

6. The invention as expressed in claim 5 in which said voltage sampling means comprises a diode and a resistor connected across said terminals and a capacitor in series with a diode connected across at least a portion of said resistor, the junction of the capacitor and the second mentioned diode being connected to the control electrode of said third silicon controlled rectifier.

7. The invention as expressed in claim 6 in which the cathode of the first mentioned diode is connected to the first of said pair of terminals.